United States Patent [19]

Hagiwara et al.

[11] Patent Number: 4,959,276
[45] Date of Patent: Sep. 25, 1990

[54] HEAT-RESISTANT, WEAR-RESISTANT AND HIGH-STRENGTH AL-SI ALLOY, AND CYLINDER LINER EMPLOYING SAME

[75] Inventors: Yoshitoshi Hagiwara; Eitaro Koya, both of Tokyo; Tetsuya Hayashi, Hyogo; Yoshinobu Takeda, Hyogo, all of Japan

[73] Assignees: Sumitomo Electric Industries, Ltd., Osaka; Honda Motor Co., Ltd., Tokyo, both of Japan

[21] Appl. No.: 429,429

[22] Filed: Oct. 31, 1989

[30] Foreign Application Priority Data

Oct. 31, 1988 [JP] Japan .................. 63-273349

[51] Int. Cl.$^5$ ............................. C22C 21/02
[52] U.S. Cl. .................. 428/614; 123/193 C
[58] Field of Search ............... 428/614; 123/193 C

[56] References Cited

U.S. PATENT DOCUMENTS

| 3,885,959 | 5/1975 | Badia et al. | 148/437 |
| 4,155,756 | 5/1979 | Perrot et al. | 75/231 |
| 4,297,976 | 11/1981 | Bruni et al. | 420/534 |
| 4,808,374 | 2/1989 | Awano et al. | 420/534 |

FOREIGN PATENT DOCUMENTS

| 0100470 | 7/1983 | European Pat. Off. . | |
| 0147769 | 12/1984 | European Pat. Off. . | |
| 0191707 | 1/1986 | European Pat. Off. . | |
| 2343895 | 10/1977 | France . | |
| 56-116851 | 9/1981 | Japan | 428/614 |
| 57-98647 | 6/1982 | Japan | 428/614 |
| 59-173234 | 10/1984 | Japan | 428/614 |
| 63-42343 | 2/1988 | Japan . | |
| 63-183147 | 7/1988 | Japan . | |
| 63-207455 | 8/1988 | Japan . | |
| 63-297534 | 12/1988 | Japan . | |
| 1-28333 | 1/1989 | Japan . | |
| 1-253553 | 10/1989 | Japan | 428/614 |
| 1-255641 | 10/1989 | Japan | 428/614 |

Primary Examiner—John P. Sheehan
Assistant Examiner—David W. Schumaker
Attorney, Agent, or Firm—Sughrue, Mion, Zinn, Macpeak & Seas

[57] ABSTRACT

A heat-resistant, wear-resistant and high-strength Al-Si alloy, wherein (A) 3 to 5% by weight based on the total amount of the alloy of alumina particles having a maximum particle diameter of 30 μm or less and an average particle diameter of 10 μm or less and having shaped with no sharp edge and (B) 0.5 to 3% by weight based on the total amount of the alloy of graphite particles having a maximum particle diameter of 10 μm or less as measured on a cross section of the Al-Si alloy structure are dispersed in a matrix consisting essentially of ingredients for an Al-Si alloy and having primary Si crystals, the sizes of the primary Si crystals being not larger than 10 μm.

3 Claims, 3 Drawing Sheets

HEAT-RESISTANT, WEAR-RESISTANT AND HIGH-STRENGTH AL-SI ALLOY, AND CYLINDER LINER EMPLOYING SAME

FIELD OF THE INVENTION

This invention relates to a high-strength Al-Si alloy having good heat and wear resistance, and also relates to an aluminum alloy cylinder liner which is for use in manufacturing an internal combustion engine and which is excellent in wear resistance and seizing resistance.

BACKGROUND OF THE INVENTION

In the conventional production of internal combustion engines for automobiles or motorcycles, cylinders have been made mostly from gray cast iron which is inexpensive and excellent in wear resistance and seizing resistance, and partly from cast aluminum alloy plated with chrome or some other metal. In recent years, however, considerable effort has been directed to decreasing the weight of engine parts to produce more fuel-efficient automobiles or motorcycles. With such a technical trend, even cylinder liners, which should have good heat resistance and wear resistance, are now required to be lighter in weight. For example, a cylinder liner made of an aluminum alloy has been proposed in JP-A-52-109415. (The term "JP-A" as used herein means an "unexamined published Japanese patent application No.".)

Further, JP-A-59-59855 and JP-A-59-59856 propose aluminum alloy shapes which are obtained by subjecting aluminum alloy powder having a specific composition to hot extrusion to provide products which can be used for various applications.

However, the aluminum alloys which have so far been proposed have some disadvantages when they are used as a cylinder liner for an internal combustion engine. Namely, cylinder liners are required to have good wear and heat resistance and be compatible with pistons. An aluminum alloy practically employable as a cylinder liner has not yet been obtainable. By way of illustration, cylinder liners made of such produced aluminum alloys are defective, as compared with conventionally known cylinder liners, in that they show a lower seizing load measured in the absence of a lubricating oil or they are more prone to attack pistons although the wear resistance of such aluminum alloy cylinder liners is almost comparable to that of conventional ones. These problems have not yet been solved.

In an attempt to solve the above problems, there has been proposed, for example, an alloy prepared by incorporating a hard material or a lubricating material into an Al-Si alloy so as to improve its insufficient wear resistance and the sliding or moving properties of the alloy. However, the incorporation of these additives causes problems with the processing and machining of the alloy. That is, in the case of an alloy in which a hard material has been incorporated, there is a great difficulty in processing the alloy. In the case where carbon, for example, is incorporated as a lubricating material into the alloy and the resulting alloy is shaped into a cylinder, there is the problem that graphite particles are linearly dispersed at the inner periphery of the cylinder in the direction of its length and this causes the radial crush strength of the alloy cylinder to be low.

The Al-Si alloys have been regarded as a hopeful material for cylinder liners because they have a smaller thermal expansion coefficient than aluminum due to the addition of Si and because their weight is low. However, if aluminum oxide or silicon carbide is incorporated as a hard material into the Al-Si alloy in order to further improve its wear resistance, the machinability of the resulting alloy becomes very poor, although the wear resistance of cylinder liners obtained from the alloy is improved.

SUMMARY OF THE INVENTION

It is, therefore, an object of the present invention to provide an Al-Si alloy useful for making cylinder liners, which has excellent machinability and high strength despite the addition of a hard material and a solid lubricating material into the alloy.

It is another object of the present invention to provide a cylinder liner made of an Al-Si alloy of the kind described above, which cylinder liner has improved wear resistance and sliding/moving properties.

The foregoing and other objects, features and advantages of the present invention will be apparent from the following detailed description and appended claims taken in connection with the accompanying drawings.

The present invention has been accomplished as a result of intensive and continuous studies made by the present inventors with a view to realizing the above objects.

The present invention provides a heat-resistant, wear-resistant and high-strength Al-Si alloy having a structure in which (A) 3 to 5% of $Al_2O_3$ particles having a maximum particle diameter of 30 μm or less and an average particle diameter of 10 μm or less and having shapes with no sharp edge and (B) 0.5 to 3% of graphite particles having a maximum particle diameter of 10 μm or less as measured on a cross section of the Al-Si alloy structure are dispersed in a matrix consisting of the ingredients for the Al-Si alloy and having primary Si crystals, the sizes of the primary Si crystals being not larger than 10 μm. (All percents used herein are by mass unless otherwise indicated.)

The present invention also provides a cylinder liner for use in making an internal combustion engine, which consists of an inner layer made of an Al-Si alloy of the above kind and having a thickness of 1 mm or more, and an outer layer made of a wrought aluminum alloy use which has an aluminum content of 90% or more, the outer layer being joined with the inner layer with the interface between the inner and outer layers and the outer periphery of the outer layer being uneven or corrugated in the circumferential direction.

DETAILED DESCRIPTION OF THE INVENTION

Figure 1:
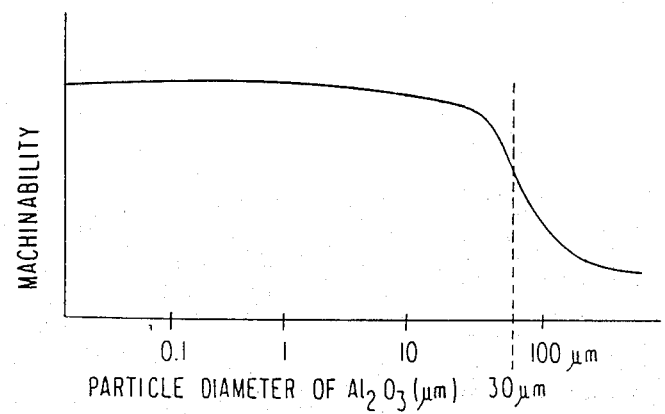
FIG. 1 is a graph showing the effect of the particle size of alumina on the machinability of Al-Si alloys containing a certain percent by weight of alumina.

According to one aspect of this invention, there is provided a heat-resistant, wear-resistant and high-strength Al-Si alloy having a structure in which (A) 3 to 5% based on the total amount of the alloy of $Al_2O_3$ particles having a maximum particle diameter of 30 μm or less (preferably 20 μm or less) and an average particle diameter of 10 μm or less (preferably 2 to 5 μm) and having shapes with no sharp edge and (B) 0.5 to 3% based on the total amount of the alloy of graphite particles having a maximum particle diameter of 10 μm or less (preferably 1 to 5 μm) as measured on a cross section of the Al-Si alloy structure are dispersed in a matrix consisting of the ingredients for the Al-Si alloy and having primary Si crystals, the sizes of the primary Si crystals being not larger than 10 μm, preferably 2 to 8 μm. (All percents used herein are by mass unless otherwise indicated.)

In a preferred embodiment of the Al-Si alloy of this invention, the ingredients for the Al-Si alloy consisting essentially of 16 to 18% Si, 4 to 6% Fe, 2 to 4% Cu, 0.5 to 2% Mg and 0.1 to 0.8% Mn, all based on the total amount of the alloy other than the alumina particles and the graphite particles, with the remaining percentage or balance consisting substantially of Al.

According to another aspect of this invention, there is provided a cylinder liner for use in making an internal combustion engine, which consists of an inner layer made of an Al-Si alloy of the above kind and having a thickness of 1 mm or more (preferably 1 to 5 mm), and an outer layer made of a conventional wrought aluminum alloy which has an aluminum content of 90% or more (preferably having a thickness of 0.5 to 10 mm), the outer layer being joined with the inner layer with the interface between the inner and outer layers and the outer periphery of the outer layer being uneven or corrugated in the circumferential direction. The wrought aluminum alloy may be JIS 2014, 5052, 6063, etc.

The unevenness or corrugation of the interface between the inner and outer layers and the outer periphery preferably has a pitch of 5° to 90° with respect to the center of the cylinder and a depth of 0.5 to 3 mm.

The following problems are conventionally encountered in processing and machining Al-Si alloys to manufacture cylindrical products. Alumina or silicon carbide is incorporated into an Al-Si alloy powder which has been solidified by rapid cooling and then the resulting powdery mixture is hot extruded to obtain a cylindrical extrudate in continuous form, which is then cut into pieces of a predetermined length and the inner surfaces of the extrudate is subjected to machining to correct any slight eccentricity that has resulted from the hot extrusion. In such a process, there are difficulties in the cutting and machining because of the presence of the hard materials but if the proportion of the hard materials is decreased to avoid the above difficulties, the wear resistance of the products is impaired. It has also been thought that too large a proportion of a hard material is undesirable because the lives of the die and mandrel used for extrusion are greatly shortened.

The present inventors made extensive studies with a view to solving the above problems and, as a result, found that the machinability of alloy extrudates is greatly affected particularly by the particle size of the above mentioned hard material, alumina ($Al_2O_3$).

FIG. 1 shows the effect of the particle size of $Al_2O_3$ on the machinability of Al-Si alloys containing 3% $Al_2O_3$. The term machinability as used herein means the quality of being suitable for cutting and machining as described above. It has been found, as FIG. 1 clearly shows, that the machinability is good in the range where the maximum particle diameter of $Al_2O_3$ is 30 μm or less, but it rapidly becomes poor with the increasing average particle diameter in the range where a maximum particle diameter is larger than 30 μm. In other words, even if $Al_2O_3$ particles which per se are hard are incorporated in an Al-Si alloy, the machining of the alloy as a whole is easy so long the sizes of the $Al_2O_3$ particles are sufficiently small. However, in the case where an Al-Si alloy in which $Al_2O_3$ particles having maximum particle diameters of 30 μm or less have been incorporated is subjected to machining, which is indispensable for the production of cylinder liners, the machining tool comes more frequently into direct contact with $Al_2O_3$ particles, and this shortens the life of the tool To eliminate this problem, it is important that the $Al_2O_3$ particles should have shapes with no sharp edge in addition to observing the above mentioned size limitation, i.e., it is important that the $Al_2O_3$ particles should be as spherical as possible.

In the case where the $Al_2O_3$ particles are nearly spherical, the resulting alloy has a strength almost comparable to that of the matrix thereof since the $Al_2O_3$ particles can be incorporated without the formation of notches in the metal matrix itself. In this connection, it should be noted that if a sleeve manufactured using $Al_2O_3$ particles in a crushed state with sharp edges is dropped from a height of 20 cm, the sleeve is easily broken. In contrast, in the case where nearly spherical $Al_2O_3$ particles are employed as in the present invention, the resulting product is free from such a problem.

Figure 2:
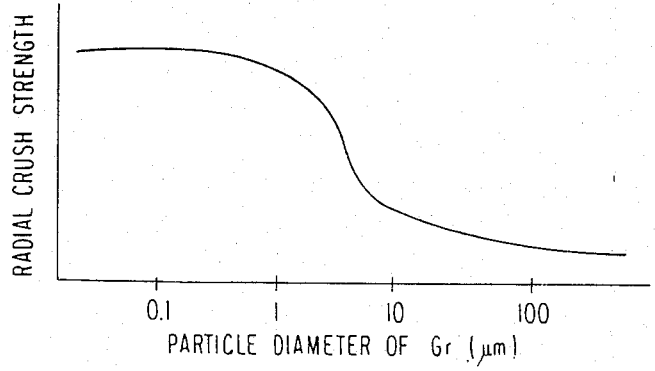
FIG. 2 is a graph showing the effect of the particle size of graphite powder on the radial crush strength of a cylindrically-formed Al-Si alloy.
Figure 3:
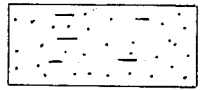
FIG. 3 is a schematic illustration showing the state of distributed graphite particles having particle diameters exceeding 10 μm in an Al-Si alloy extrudate.

The present inventors also studied solid lubricating materials to be incorporated into an Al-Si alloy. FIG. 2 shows the effect of the particle size of graphite (hereinafter sometimes abbreviated Gr) on the radial crush strength of a cylindrical Al-Si alloy. In the case where graphite particles having relatively large particle diameters are incorporated into an Al-Si alloy and the resulting alloy is hot extruded, each of the graphite particles is crushed and distributed linearly in the direction of extrusion since graphite particles are prone to be easily crushed. Such a linear distribution of graphite particles greatly impairs the strength of the cylindrical alloy extrudate. Particularly, in the case of a cylindrical extrudate containing graphite particles having maximum diameters exceeding 10 μm as measured on a cross section of the extrudate structure, the state of the distributed graphite particles is as shown in FIG. 3, which impairs the radial crush strength of the cylindrical extrudate. In contrast, in the case of a cylindrical extrudate containing graphite particles having maximum diameters of 10 μm or less, the radial crush strength of the cylindrical extrudate was found to be unaffected, or not lowered, by the incorporation of the graphite particles. The "maximum diameter measured on a cross section" means the maximum diameter which is measured on the cross section perpendicular to the direction of extrusion when the extrusion molding is employed for example.

Figure 4:
FIG. 4 is a schematic illustration showing the state of distributed graphite particles having particle diameters not more than 5 μm in an Al-Si alloy extrudate.

The state of distributed graphite particles in such an extrudate is shown in FIG. 4, in which even if there are graphite particles distributed in lines extending in the direction of the length of the extrudate as shown in FIG. 3, the proportion of such particles is small and most of the graphite particles are present in a well dispersed state.

The aforementioned undesirable linear distribution of graphite particles occurs during extrusion as follows. When an Al-Si alloy is extruded, the alloy being extruded undergoes plastic flow, and as the alloy thus flows, large graphite particles or graphite agglomerates are gradually crushed or deagglomerated and then linearly distributed like stringers, along the direction of flow of the metal, in the direction of the length of the cylindrical extrudate. This linear distribution of graphite particles in the direction of the length means that the cylindrical Al-Si alloy extrudate will have defects which extend in the direction of the length of the extrudate, and the strength of the cylindrical extrudate will be very low.

As a result of extensive studies of such a drawback resulting from the incorporation of graphite particles into an Al-Si alloy, the present inventors found that as the maximum particle diameter of the graphite particles contained in a cylindrical Al-Si alloy extrudate is decreased to and below 10 $\mu$m as measured on a cross section of the extrudate structure (specifically, in general, the alloy extrudate has a structure in which the linearly distributed graphite particles lying in the direction of extrusion have a maximum length (long diameter) of 200 $\mu$m or less and a maximum width (short diameter) of 10 $\mu$m or less), the radial crush strength of the cylindrical alloy extrudate is greatly improved. The reason for this may be that there is a close relationship between the diameters of primary Si crystals and the diameters of the graphite particles incorporated. In view of the fact that the flux of the plastic flow of an Al-Si alloy depends on the sizes of primary Si crystals, it can be reasonably concluded that graphite particles having diameters not larger than a certain value are not substantially destroyed or crushed during extrusion.

The Al-Si alloy of this invention contains 3 to 5% based on the total amount of the alloy of $Al_2O_3$ particles and 0.5 to 3% based on the total amount of the alloy of graphite particles. If the contents of $Al_2O_3$ and graphite are outside the respective ranges, the resulting alloy is poor in desired properties, such as wear resistance, machinability and toughness, and particularly, a cylinder liner formed from such an alloy will not give satisfactory performance, i.e., with respect to wear resistance and seizing resistance.

The functions of graphite in a cylinder liner have not yet been fully elucidated. However, it can reasonably be concluded that initially the graphite particles act as a solid lubricating material to reduce friction between the cylinder liner and the piston, and thereafter, part of the graphite particles gradually fall off the cylinder liner during prolonged use and the resulting voids serve to retain liquid lubricant or the like.

The incorporation of the graphite powder into an Al-Si alloy creates difficulties in the mixing of the Al-Si alloy and the graphite powder and in the compacting of the resulting mixture. Of these, the compacting difficulty is more serious, and the compactability of the powdery mixture becomes poorer as the amount of the graphite incorporated is increased. To solve this problem, the powdery mixture is compacted at a pressure as high as 1 to 4 ton/cm$^2$ or higher, preferably 2 ton/cm$^2$. In addition, there may be employed a method where an Al-Si alloy powder having larger particle diameters (e.g., 50 to 80 $\mu$m) is used, or a method in which an Al-Si alloy powder is annealed (e.g., at 300° to 500° C.) before use.

The dispersion of the alumina particles and the graphite particles in the Al-Si alloy powder can be carried out by using any mixer in the dry state.

The thus-obtained powdery mixture compact is inserted into, for example, a soft Al alloy tube (Al 96%) having a wall thickness of about 8 mm, and the resulting tube hot extruded, whereby a double-layered cylinder liner made of aluminum alloy is obtained. The thus-obtained cylinder liner of this invention was compared in performance with conventional ones and the results are shown in FIG. 5 and FIG. 6.

Figure 5:
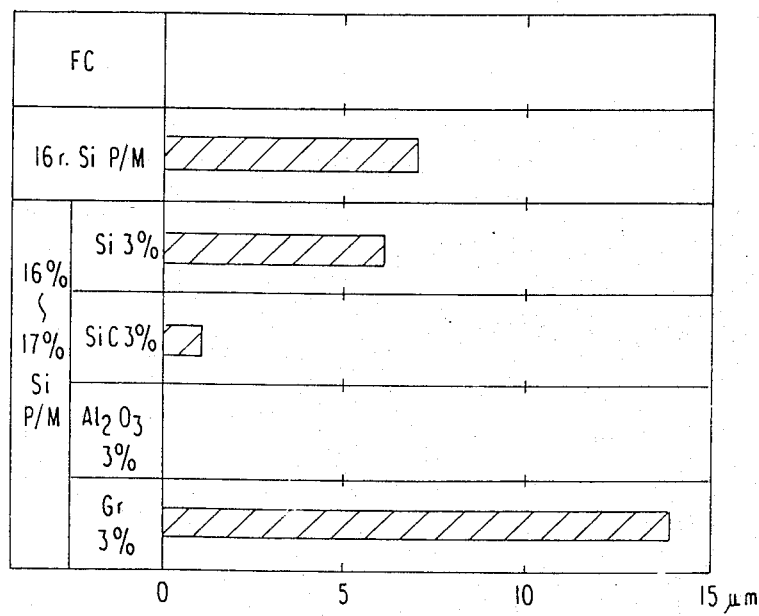
FIG. 5 is a graph showing a comparison of wear amounts which were measured under the boundary lubrication.

FIG. 5 shows a comparison of wear amounts as measured through friction with a hard chromium plated piston driven by a motor (under boundary lubrication conditions).

Figure 6:
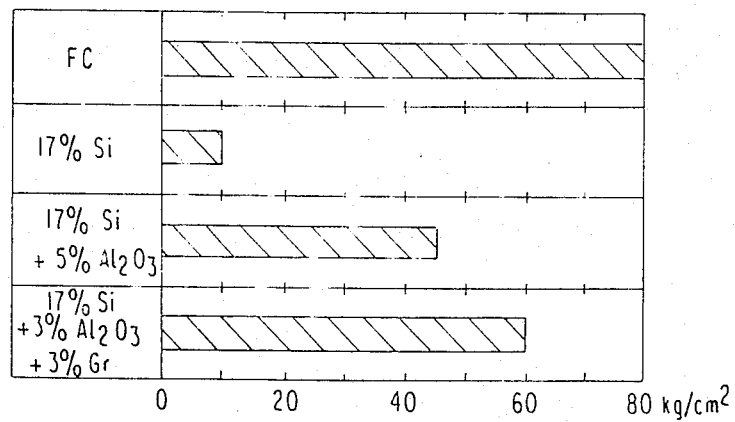
FIG. 6 is a graph showing a comparison of seizing loads which were measured under no lubrication.

FIG. 6 shows a comparison of seizing loads as measured through friction with a piston material (JIS AC8A) by means of a chip-on-disc type wear tester under no lubrication.

In FIGS. 5 and 6, FC represents cast iron and P/M represents a powder metallurgic material.

According to the present invention, there is provided an Al-Si alloy which has improved wear resistance, toughness and seizing resistance as well as good machinability, i.e., suitability for cutting, machining, etc. Due to these properties, the Al-Si alloy of this invention can be usefully employed as a material for cylinder liners.

The present invention will be illustrated in more detail with reference to the following Examples, which should not be construed to be limiting the scope of the invention.

EXAMPLE 1

By air atomization, there was prepared a 60-mesh alloy powder which was based on Al and contained 17.2% Si, 5.1% Fe, 3.3% Cu, 1.1% Mg, 0.4% Mn, and balance Al.

Then, spherical $Al_2O_3$ powders having a mode particle diameter of 2 $\mu$m with different maximum particle diameters were separately added to the above-prepared alloy powder in various amounts, and each of the resulting mixtures was stirred by means of a V-type mixer. Further, the same procedures as above were repeated except that 1% Gr powder (maximum particle diameter: 5 $\mu$m) was also incorporated into each of the powdery mixtures. Each of the thus-obtained powdery mixtures was compacted into a rod of 80 mm in diameter with a hot press at 450° C. and 4 ton/cm$^2$, and evaluated for machinability.

The machining was performed under the following conditions: cutting speed 100 m/min; feed rate 0.1 mm/rev; cutting depth 0.2 mm. The machining tool used was made of a cemented carbide. After machining for 10 minutes, a flank wear $V_B$ was evaluated. The results obtained are shown in Tables 1 and 2.

TABLE 1

| Maximum particle diameter ($\mu$m) | Amount of $Al_2O_3$ (%) (Gr = 0%) | | | |
|---|---|---|---|---|
| | 1 | 3 | 5 | 7 |
| 3 | A | A | A | B |
| 8 | A | A | A | B |
| 15 | A | B | C | C |
| 30 | B | B | C | C |
| 50 | C | C | C | C |

TABLE 2

| Maximum particle diameter ($\mu$m) | Amount of $Al_2O_3$ (%) (Gr = 1%) | | | |
|---|---|---|---|---|
| | 1 | 3 | 5 | 7 |
| 3 | A | A | A | A |
| 8 | A | A | A | B |
| 15 | A | A | A | B |
| 30 | B | B | B | C |
| 50 | C | C | C | C |

Note:
A less than 0.05 $\mu$m
B 0.05 to 0.1 $\mu$m
C more than 0.1 $\mu$m

The above results show the following. In the case where the maximum particle diameter of the $Al_2O_3$ was larger than 30 $\mu$m, the $V_B$ wear was very large. The incorporation of Gr serves to decrease the $V_B$ wear. From the viewpoint of machinability, preferred amounts of $Al_2O_3$ are 5% or less and it is desirable that the $Al_2O_3$ should have a maximum particle diameter of 30 $\mu$m or less. Machinability can be improved by the incorporation of Gr. To sum up, good machinability can be attained with alloys in which up to about 5% of $Al_2O_3$ having a maximum particle diameter of 30 $\mu$m or less has been incorporated into the alloys.

EXAMPLE 2

A 100-mesh air-atomized alloy powder was prepared which was based on Al and contained 16.5% Si, 4.8% Fe, 3.1% Cu, 1.3% Mg and 0.6% Mn, balance Al. There was added thereto 3% of spherical $Al_2O_3$ particles (mode particle diameter: 3 $\mu$m, maximum diameter: 10 $\mu$m), and, further, graphite powders with different maximum particle diameters were separately added thereto in various amounts. Each of the resulting mixtures was stirred by means of a rotating-blade mixer, and then formed into a billet having a diameter of 165 mm and a length of 300 mm at 2 ton/cm². Each of the billets was inserted into a pipe having an inner diameter of 170 mm, an outer diameter of 180 mm and a length of 300 mm which was made of an Al alloy JIS 5052 (based on Al and containing 2.5% Mg, 0.1% Cu, 0.1% Mn, 0.4% Fe, 0.2% Cr, and balance Al), thereby obtaining a composite billet.

Further, similar composite billets were prepared which were the same as some of the above obtained billets except that crushed $Al_2O_3$ having edges formed by crushing was incorporated in place of the spherical $Al_2O_3$ particles. Additionally, a pipe having the same dimension as above was prepared by using only the Al-Si alloy (sheath-less extrudate).

Each of the above obtained composite billets was formed into a cylindrical extrudate having an outer diameter of 65 mm and an inner diameter of 50 mm by means of indirect double-action hot extrusion at 450° C., and subjected to a radial crush strength test. The results are summarized in Table 3.

TABLE 3

| Gr particle diameter ($\mu$m) | Amount of Gr (%) | | | |
|---|---|---|---|---|
| | 0.5 | 1.0 | 3.0 | 5.0 |
| 1 | A | A | A | A |
| 5 | A | A | A | B |
| 10 | A | B | B | C |
| 20 | C | C | C | C |
| 5 Sheath-less extrudate | C | C | C | C |
| 5 Crushed $Al_2O_3$ incorporated extrudate | C | C | C | C |

Note:
A more than 60 kg/mm²
B 40 to 60 kg/mm²
C less than 40 kg/mm²

The above results show that the extrudates prepared by the use of Gr powders having particle diameters more than 10 $\mu$m showed very low radial crush strengths. In the case of the extrudate containing 5 $\mu$m Gr powder, it showed a poor strength when the amount of Gr incorporated was larger than 5%. Further, the extrudates having a sheath showed higher radial crush strengths than those with no sheath. Furthermore, the extrudates prepared by the use of crushed $Al_2O_3$ showed poor strengths.

From the viewpoint of radial crush strength, it is preferable that the amount of the Gr powder incorporated should be 3% or less, the particle diameter of the Gr powder be 10 $\mu$m or less, the cylindrical extrudate have a sheath, and the $Al_2O_3$ particles be spherical.

EXAMPLE 3

An air-atomized alloy powder (100 mesh) based on Al and containing 18% Si, 0, 2, 4, 6, 8 or 10% Fe, 3% Cu, 1% Mg, 0.5% Mn, and balance Al was mixed with 3% $Al_2O_3$ (mode particle diameter: 3 $\mu$m) and 1% Gr (maximum particle diameter: 5 $\mu$m). Each of the resulting powdery mixtures having different Fe contents was separately compacted in the same manner as in Example 2, and then cast in an Al alloy JIS ADC12 (based on Al and containing 12% Si, 3% Cu, 0.5% Mn, 1/3% Fe and balance Al). Before and after the casting, Rockwell B scale hardness $H_RB$ was measured on each sample. Further, the radial crush strength of each sample was also measured. The results obtained are shown in Table 4.

TABLE 4

| | Amount of Fe | | | | | |
|---|---|---|---|---|---|---|
| | 0 | 2.1 | 4.0 | 6.1 | 8.3 | 10.4 |
| Hardness $H_RB$ before casting | 78 | 80 | 84 | 88 | 91 | 94 |
| Hardness $H_RB$ after casting | 65 | 70 | 79 | 84 | 88 | 90 |
| Decrease in hardness | 13 | 10 | 5 | 4 | 3 | 4 |
| Radial crush strength | 61 | 66 | 71 | 72 | 65 | 54 |

It can be seen from the above results that the samples prepared by the use of air-atomized alloy powders having Fe contents lower than 4% not only had low hardness but also suffered high decreases in hardness, and that the samples prepared by the use of air-atomized alloy powders having Fe contents higher than 6% were poor in toughness. Therefore, the preferred Fe content in the alloy is from 4 to 6%.

EXAMPLE 4

Under various conditions, an alloy powder based on Al and containing 17.2% Si, 5.1% Fe, 3.3% Cu, 1.1% Mg, 0.4% Mn, and balance Al was mixed with $Al_2O_3$ (average particle diameter: 3 $\mu$m) and Gr (maximum particle diameter: 5 $\mu$m) and the resulting mixture was compacted to study the effects of the compacting pressure, the size of the alloy particles and alloy powder-softening treatment (annealed at 300° C. for 2 hours). The compacts, each having a diameter of 60 mm and a length of 100 mm, obtained under various conditions as shown in Table 5 were dropped from a height of 20 cm, and the results are summarized in Table 5.

TABLE 5

| Size of Al alloy powder | $Al_2O_3$ (%) | Gr (%) | Compacting pressure (ton/cm$^2$) | | | |
|---|---|---|---|---|---|---|
| | | | 1 | 2 | 3 | 4 |
| 100 mesh | 3.1 | 1 | B | B | A | A |
| 100 mesh | 5 | 0.5 | B | B | A | A |
| 100 mesh (annealed) | 5 | 0.5 | B | A | A | A |
| 325 mesh | 5 | 0.5 | B | B | A | A |
| 150 mesh (excluding 250-mesh particles) | 5 | 0.5 | B | A | A | A |
| 42 mesh (excluding 100-mesh particles) | 5 | 0.5 | A | A | A | A |

Note:
A unbroken
B broken

It can be seen from Table 5 that good compactability was attained where the compacting pressure was high, the hardness of the allow powder was low and the particles of the powder were coarse.

EXAMPLE 5

Figure 7A:
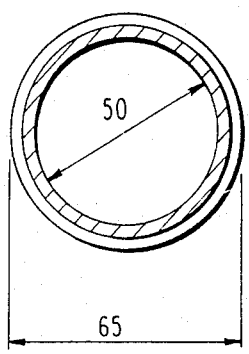
FIGS. 7(a) and 7(b) are schematic cross-sectional views illustrating embodiments of a composite billet according to this invention.
Figure 7B:
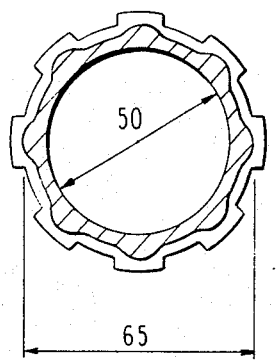

Using a 100-mesh alloy powder based on Al and containing 18% Si, 4% Fe, 2.8% Cu, 1.0% Mg, 0.4% Mn, and balance Al, there were prepared the same composite billets as prepared in Example 2. This composite billet was extruded into two shapes having sections as shown in FIGS. 7(a) and 7(b), respectively, using indirect single-acting extrusion.

Figure 8:
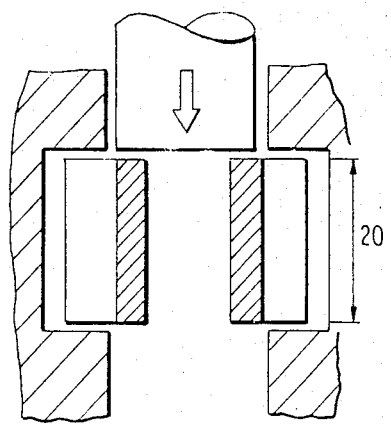
FIG. 8 is a schematic illustration of a shear test performed in Example 5 later given.

Each of the above obtained two shapes was subjected to a shear test as schematically illustrated in FIG. 8 (i.e., only the outer layer was fixed and a load was applied to the inner layer) after a heat cycle treatment (30 cycles, each cycle consisting of 500° C. heating for 30 min and then cooling with water), to measure the load required for unsheathing the inner layer. As a result, the load at which the sample was broken for the shape of FIG. 7(a) was found to be 7 tons, while that for FIG. 7(b) was found to be 28 tons. The shape of FIG. 7(b) is thus superior in that the corrugated interface between the inner layer and the outer layer serves to prevent the outer layer from revolving around the inner layer.

EXAMPLE 6

The same extrudates as were prepared in Example 2 using the 5 $\mu$m Gr were prepared as in Example 2. The extrudates included ones having a sheath and ones having no sheath, were separately cast in an Al alloy JIS ADC12. In the case of the extrudates with no sheath, blisters developed on the outer peripheries thereof in contact with molten Al alloy JIS AC8A, whereas the extrudates with a sheath gave good results.

While the invention has been described in detail and with reference to specific examples thereof, it will be apparent to one skilled in the art that various changes and modifications can be made therein without departing from the spirit and scope thereof.

What is claimed is:

1. A heat-resistant, wear-resistant and high-strength Al-Si alloy wherein
   (A) 3 to 5% by weight based on the total amount of the alloy of alumina particles having a maximum particle diameter of 30 $\mu$m or less and an average particle diameter of 10 $\mu$m or less and having shapes with no sharp edge and
   (B) 0.5 to 3% by weight based on the total amount of the alloy of graphite particles having a maximum particle diameter of 10 $\mu$m or less as measured on a cross section of the Al-Si alloy structure
   are dispersed in a matrix consisting essentially of ingredients for an Al-Si alloy and having primary Si crystals, the sizes of the primary Si crystals being not larger than 10 $\mu$m.

2. An Al-Si alloy according to claim 1, wherein said ingredients for an Al-Si alloy consisting essentially of:
   16 to 18% by weight of Si,
   4 to 6% by weight of Fe,
   2 to 4% by weight of Cu,
   0.5 to 2% by weight of Mg,
   0.1 to 0.8% by weight of Mn, based on the total amount of the alloy other than said alumina particles and said graphite particles, and balance of Al.

3. A double-layered cylinder liner for use in making an internal combustion engine, which comprises:
   an inner layer comprising a heat-resistant, wear-resistant and high-strength Al-Si alloy wherein (A) 3 to 5% by weight based on the total amount of the alloy of alumina particles having a maximum particle diameter of 30 $\mu$m or less and an average particle diameter of 10 $\mu$m or less and having shapes with no sharp edge and (B) 0.5 to 3% by weight based on the total amount of the alloy of graphite particles having a maximum particle diameter of 10 $\mu$m or less as measured on a cross section of the Al-Si alloy structure are dispersed in a matrix consisting of ingredients for an Al-Si alloy and having primary Si crystals, the sizes of said primary Si crystals being not larger than 10 $\mu$m, said inner layer having a thickness of 1 mm or more, and
   an outer layer made of a wrought aluminum alloy which has an aluminum content of 90% by weight or more, said outer layer being joined with said inner layer,
   the interface between said inner and outer layers and the outer periphery of said outer layer being uneven or corrugated in the circumferential direction.

* * * * *